United States Patent Office 3,373,033
Patented Mar. 12, 1968

3,373,033
ESTROGENIC COMPOUNDS AND ANIMAL GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 561,373, June 29, 1966. This application Mar. 3, 1967, Ser. No. 620,270.
10 Claims. (Cl. 99—2)

ABSTRACT OF THE DISCLOSURE

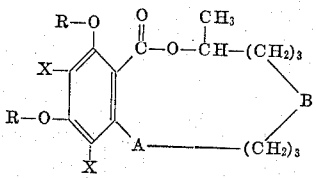

where A is selected from the group consisting of —CH=CH— and —CH$_2$CH$_2$—; R is selected from the group consisting of hydrogen, lower alkyl, benzyl and lower saturated acyclic acyl; X is selected from the group consisting of hydrogen, —SO$_3$H, —SO$_3$R$_1$, —SO$_2$Cl and —SO$_2$NHR$_2$ wherein R$_1$ is lower alkyl and R$_2$ is selected from the group consisting of hydrogen, alkyl of about 1 to 20 carbon atoms, monocyclic aryl and halogen with the proviso that not more than one X is hydrogen and that R is selected from the group consisting of lower alkyl and benzyl when X is —SO$_2$Cl, and B is selected from the group consisting of >C=O, >CHOH and >CH$_2$ with the proviso that A is —CH$_2$—CH$_2$—, when B is >CH$_2$; and animal feeds containing growth promoting amounts thereof.

---

This application is a continuation-in-part of application Ser. No. 561,373, filed June 29, 1966, now abandoned.

The present invention relates to new sulfo-containing compounds and an object of the present invention is to provide compounds which exhibit estrogenic activity or aid in increasing the rate of growth in meat-producing animals, e.g., cattle, lambs and swine.

A conventional formula for the compounds of the present invention is:

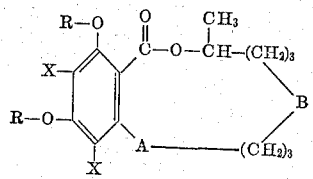

where A is —CH$_2$—CH$_2$— or —CH=CH—; R is hydrogen; substituted or unsubstituted alkyl, e.g. lower alkyl such as methyl, ethyl, hexyl, etc.; acyl, e.g., lower saturated acyclic acyl radicals such as acetyl; or aralyl, e.g., benzyl and bromo benzyl; X is hydrogen, —SO$_3$H, —SO$_2$Cl, —SO$_3$R$_1$ or —SO$_2$NHR$_2$ where R$_1$ is alkyl, e.g., lower alkyl of from about 1 to 8 carbon atoms, and R$_2$ is hydrogen, halo, such as chloro, a saturated aliphatic radical of 1 to 20 carbon atoms, the substituents of which do not interfere with the sulfonation reaction, especially lower alkyls, aryl such as monocyclic aryls including phenyl and substituted phenyl, the substitutents of which do not interfere with reaction such as chlorophenyl and nitrophenyl; with the provisos that not more than one X is hydrogen and that when X is —SO$_2$Cl, R is lower alkyl or benzyl; and B is >C=O, >CHOH or >CH$_2$, with the proviso that when B is >CH$_2$, A is —CH$_2$—CH$_2$—.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g. vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention are produced by sulfonation of the compound:

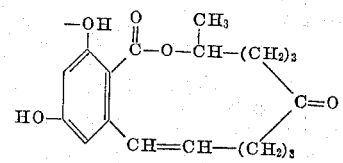

hereinafter referred to as the fermentation estrogenic substance (F.E.S.) to add one, or more, sulfonic acid radicals to the benzene ring. F.E.S. sulfonamides can be produced by reaction of the F.E.S. sulfonic acid chloride with an amine, i.e., of the formula NH$_2$R$_2$ where R$_2$ has the above meaning. The alkyl esters of F.E.S. sulfonic acids, where X is —SO$_3$R$_1$, are produced by reaction of the F.E.S. sulfonic acid chloride with an alkanol of the formula R$_1$OH where R$_1$ has the above meaning or by heating the sodium salt of the sulfonic acid with an alkyl sulfate. The F.E.S. sulfonic acids of this invention are also useful as intermediates in the production of nitro or amine substituted F.E.S. compounds as shown in U.S. patent application Ser. No. 561,369, filed on even date herewith.

It is desirable to protect the hydroxyl groups of F.E.S. against undesirable side reactions before sulfonation which can be accomplished by converting the hydroxyl groups to ethers, e.g., methyl ethers, as taught in U.S. Patent 3,239,-342 and subsequently removing the masking group to regenerate the hydroxyl group. The hydroxyl group can be regenerated from, for example, a methyl ether by hydrolysis or by refluxing in acetic acid solution with hydrobromic acid. Aluminum chloride is another effective dealkylating agent. Other suitable masking groups include generally lower alkyls and benzyl. Compounds where R is benzyl are described in copending application Ser. No. 532,113, filed Mar. 7, 1966, now abandoned, and application Ser. No. 620,259, filed Mar. 3, 1967, U.S. Patents 3,239,354; 3,239,347 and 3,239,356, for example, describe dihydro F.E.S. compounds where A is —CH$_2$CH$_2$— and R is acyl or a combination of alkyl and acyl. Tetrahydro F.E.S. where B is >CHOH is described in U.S. Patent 3,239,345 and deoxy F.E.S. where B is >CH$_2$ is described in U.S. Patent 3,239,341. Compounds where R is acyl can be prepared by first sulfonating an alkyl ether of F.E.S., hydrolyzing the ether and subsequently acylating the compound.

The following examples are offered to illustrate this invention; however, the invention is not limited to the specific materials, amounts, and procedures set forth.

Example I

Five milliliters of 100% $H_2SO_4$ (equal volumes of 97% $H_2SO_4$ and 20% oleum) were cooled in an ice salt bath until it solidified and then 1 g. of F.E.S. was added to the frozen mass and mixed to form a mush. The temperature was allowed to rise until the acid melted and the reaction mixture was mixed until all F.E.S. had dissolved. After standing 2 hours at refrigerator temperature, the solution was poured onto ice to yield a precipitate which was separated by decantation.

The precipitate was dissolved in sufficient water to form a non-gelatinous solution and treated with char to decolorize. Char was removed by filtration and the product was recrystallized by addition of concentrated HCl until about one third volume of HCl had been added per volume of solution. When crystallization was complete, the product was collected by filtration and dried in vacuo to yield 492 mg., M.P. 114–115° C.

| Analysis $C_{18}H_{22}O_8S \cdot 1\frac{1}{2}H_2P$ | Calculated | Found |
|---|---|---|
| Percent C | 50.81 | 50.05 |
| Percent H | 5.92 | 6.14 |
| Percent O | 35.72 | 35.82 |
| Percent S | 7.53 | 7.68 |

This compound is soluble in water to yield strongly acid solutions. Adjusting the pH of such solution to 7.0, with a base, including sodium or potassium hydroxide, yields a solution from which a water soluble, neutral salt is obtained by evaporation or lyophilization.

Example II

Dihydro F.E.S., tetrahydro F.E.S., deoxy tetrahydro F.E.S., F.E.S. diethyl ether, dihydro F.E.S. dimethyl ether, and F.E.S. 4-benzyl ether are sulphonated by the process of Example I at a somewhat higher temperature.

Example III

F.E.S. 2,4-dimethyl ether sulfonic acid is produced according to Example I, substituting F.E.S. 2,4-dimethyl ether for F.E.S., and then reacted in aqueous solution with sodium hydroxide to produce the sodium salt of F.E.S. 2,4-dimethyl ether sulfonic acid. A reaction mixture of 3 mols F.E.S. dimethyl ether sulfonic acid sodium salt and 1 mol $PCl_5$ is heated at 170°–180° C., to produce the corresponding acid chloride. The reaction mixture is cooled and the acid chloride separated and dried.

F.E.S. sulfonic acid chlorides are also produced according to the process of Example III substituting dihydro F.E.S. 2,4-dimethyl ether, tetrahydro F.E.S. trimethyl ether and deoxy F.E.S. 2,4-dimethyl ether.

Example IV

F.E.S. 2,4-dimethyl ether sulfonic acid chloride is stirred with methanol to produce the methyl ester of F.E.S. 2,4-dimethyl ether sulfonic acid, which is recovered.

Example V

F.E.S. 2,4-dimethyl ether sulfonic acid chloride is shaken with aqueous ammonia to produce F.E.S. 2,4-dimethyl ether sulfonamide which crystallizes from alcohol and has the formula

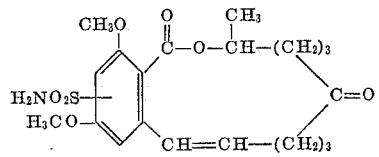

Example VI

The following amines are substituted for ammonia in the process of Example V to produce the corresponding F.E.S. 2,4-dimethyl ether sulfonamide: methylamine, ethylamine, n-amylamine, aniline, chloroaniline, nitroaniline and laurylamine.

Example VII

F.E.S. 2,4-dimethyl ether sulfonamide is reacted with sodium hypochlorite to produce the chloroamide

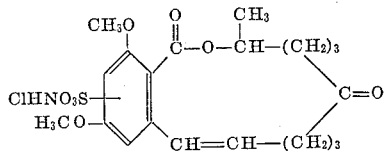

Example VIII

Dihydro F.E.S. 2,4-dimethyl ether sulfonic acid chloride is substituted for F.E.S. 2,4-dimethyl ether sulfonic acid chloride in the procedure set forth in Example V to produce a compound having the formula

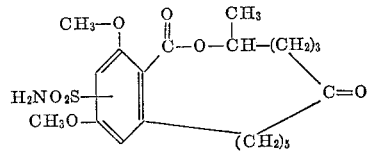

The corresponding compound is produced from deoxy F.E.S.

Example IX

The sulfonation porduct of Example V is demethylated by heating at 120° C. in benzene solution with two equivalents of aluminum chloride and the demethylated product is acylated with acetic anhydride to produce the corresponding 2,4-diacetyl substituted F.E.S. sulfonamide.

Example X

Six head of cattle are fed a daily ration including a mixture of alfalfa hay and ground corn cobs containing from 1 to 20 ounces of the compound produced in Example I per hundred pounds of ration and their rate of growth is increased.

Example XI

Six head of cattle are fed a daily ration including a mixture of alfalfa hay and ground corn cobs containing from 1 to 20 ounces of the compound produced in Example V per hundred pounds of ration and their rate of growth is increased.

The following are specific examples of animal feed compositions of this invention useful for increasing the rate of growth and feed efficiency of young animals to market weight.

Example XII

For young beef cattle, i.e., calves to yearlings running to two year olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Mollasses dried beet pulp | do | 34.5–37.5 |
| Alfalfa pellets | do | 8.0 |
| Tallow | do | 2.5 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMI.U./ton | 2–4 |

Note.—Milo or corn, for example, can be substituted for the barley.

The compound of Example I is admixed with the above ingredients in a stationary blender or a feed mix truck in the following amounts in grams per ton to provide an appriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

*Example XIII*

For young swine, i.e., six week old pigs to about 100 pound pigs, each animal is given 5 to 20 milligrams per day of the compound of Example IV intimately admixed in about 1½ to 5½ pounds per head per day of a grower ration until it reaches a weight of about 100 pounds. When the swine weigh between 90 and 125 pounds the feed is changed to one whereby each amimal is given 20 to 50 milligrams per day of the compound of Example IV intimately admixed in about 5½ to 10 pounds per head per day of a finisher ration until it reaches market weight of about 220 pounds. The grower and finisher ration include in addition to the compound of Example IV the following:

| | Grower, Percent | Finisher, Percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example IV is admixed with the above ingredients in a blender in the following amounts in milligrams per pound to provide an appropriate feed with dosage levels ranging from 6 to 96 milligrams per head per day.

| Mg./pound: | Mg./head/day |
|---|---|
| 2 | 6 |
| 4 | 12 |
| 8 | 24 |
| 16 | 48 |
| 32 | 96 |

*Example XIV*

For 4 to 10 month old lambs weighing 50 to 70 pounds, each animal is given 1 to 15 milligrams per day of the compound of Example V, intimately admixed in about 3 to 6 pounds per head per day of a complete ration for 30 to 90 days. The complete ration includes in addition to the compound of Example V the following:

| | Lbs. |
|---|---|
| Finely ground corn cobs | 630 |
| Ground cron | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example V is admixed with the above ingredients in a blender in the following amounts in milligrams per pound to provide an appropriate complete feed with dosage levels ranging from 1 to 15 milligrams per head per day.

| Mg./pound | Mg./head/day |
|---|---|
| .5 | 2 |
| 1.0 | 4 |
| 1.5 | 6 |
| 2.0 | 8 |
| 2.5 | 10 |
| 3.75 | 15 |

*Example XV*

For broilers, i.e., day old to four week old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example VII in the grower and finisher feed each of which includes in addition to the compound of Example VII the following:

| | Grower (lbs.) | Finisher (lbs.) |
|---|---|---|
| Ground Yellow Corn | 1,000 | 1,200 |
| Soybean meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins Trace Minerals and Antibiotics | 10 | 10 |

It is claimed:
1.

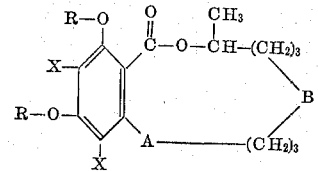

where A is selected from the group consisting of

—CH=CH— and —CH$_2$CH$_2$—; R is selected from the group consisting of hydrogen, lower alkyl, benzyl and lower saturated acyclic acyl; X is selected from the group consisting of hydrogen, —SO$_3$H, —SO$_3$R$_1$, —SO$_2$Cl and —SO$_2$NHR$_2$ wherein R$_1$ is lower alkyl and R$_2$ is selected from the group consisting of hydrogen, alkyl of about 1 to 20 carbon atoms, monocyclic aryl and halogen with the provisos that not more than one X is hydrogen and that R is selected from the group consisting of lower alkyl and benzyl when X is SO$_2$Cl, and B is selected from the group consisting of >C=O, >CHOH and >CH$_2$ with the proviso that A is —CH$_2$—CH$_2$—, when B is >CH$_2$.

2. The compound of claim 1 wherein A is

—CH=CH—, B is >C=O

R and Y are hydrogen, and X is —SO$_3$H.

3. The compound of claim 1 wherein A is

—CH=CH—, B is >C=O

R and X are hydrogen, and Y is —SO$_3$H.

4. The compound of claim 1 wherein —SO$_3$H and Y is hydrogen.

5. The compound of claim 1 wherein X is —SO$_3$R$_1$.
6. The compound of claim 1 wherein X is —SO$_2$Cl.
7. The compound of claim 1 wherein X is —SO$_2$NHR$_2$.
8. The compound of claim 1 wherein X is SO$_3$H.
9. An animal feed comprising a nutritional diluent and growth promoting amounts of the compound of claim 1.
10. An animal feed comprising a nutritional diluent and growth promoting amounts of the compound of claim 2.

No references cited.

A. LOUIS MONACELL, *Primary Examiner.*
H. H. KLARE III, *Examiner.*

UNITED STATES PATENT OFFICE
CERTIFICATE OF CORRECTION

Patent No. 3,373,033                      March 12, 1968

Edward B. Hodge et al.

It is certified that error appears in the above identified patent and that said Letters Patent are hereby corrected as shown below:

Column 1, line 60, "aralyl" should read -- aralkyl --; line 68, "substitutents" should read -- substituents --. Column 3, line 26, in the table, "$H_2P$" should read -- $H_2O$ -- Column 4, line 34, "porduct" should read -- product --. Column 5, line 27, "amimal" should read -- animal --; line 69, "cron" should read -- corn --. Column 6, line 74, after "wherein" insert -- X is --. Column 7, line 4, "$SO_3H$" should read -- $-SO_3H$ --.

Signed and sealed this 7th day of October 1969.

(SEAL)
Attest:

Edward M. Fletcher, Jr.                      WILLIAM E. SCHUYLER, JR.
Attesting Officer                                Commissioner of Patents

UNITED STATES PATENT OFFICE
CERTIFICATE OF CORRECTION

Patent No. 3,373,033                 Dated March 12, 1968

Inventor(s) EDWARD B. HODGE ET AL

It is certified that error appears in the above-identified patent and that said Letters Patent are hereby corrected as shown below:

Column 4, line 15, in the formula, "C1HNO$_3$S-" should read --C1HNO$_2$S- --.

Column 6, line 69, "Y" should read --X in the 5-position of the benzene ring--.

Column 6, line 73, "Y" should read --X in the 5-position of the benzene ring--.

Column 6, line 74, after "wherein" and before "-SO$_3$H" insert --one X is--.

Column 6, line 74, "Y" should read --the other X--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents